(12) United States Patent
Kersten (10) Patent No.: US 11,933,061 B2
(45) Date of Patent: Mar. 19, 2024

(54) METHOD FOR PRETENSIONING A TOWER OF A WIND POWER PLANT

(71) Applicant: Wobben Properties GmbH, Aurich (DE)

(72) Inventor: Roy Kersten, Hohenwarthe (DE)

(73) Assignee: Wobben Properties GmbH, Aurich (DE)

( * ) Notice: Subject to any disclaimer, the term of this patent is extended or adjusted under 35 U.S.C. 154(b) by 346 days.

(21) Appl. No.: 17/311,637

(22) PCT Filed: Nov. 21, 2019

(86) PCT No.: PCT/EP2019/082025
§ 371 (c)(1),
(2) Date: Jun. 7, 2021

(87) PCT Pub. No.: WO2020/114789
PCT Pub. Date: Jun. 11, 2020

(65) Prior Publication Data
US 2022/0025670 A1    Jan. 27, 2022

(30) Foreign Application Priority Data

Dec. 7, 2018  (DE) .................... 10 2018 131 443.4

(51) Int. Cl.
*E04H 12/16*    (2006.01)
*E02D 27/42*    (2006.01)
(Continued)

(52) U.S. Cl.
CPC .......... *E04H 12/16* (2013.01); *E02D 27/425* (2013.01); *E04C 5/12* (2013.01); *F03D 13/22* (2016.05); *F05B 2240/912* (2013.01)

(58) Field of Classification Search
CPC ....... E04H 12/16; E02D 27/425; F03D 13/22; E04C 5/12; F05B 2240/912
See application file for complete search history.

(56) References Cited

U.S. PATENT DOCUMENTS 9,617,752 B2    4/2017  Wagner
10,358,787 B2   7/2019  Coordes et al.
(Continued)

FOREIGN PATENT DOCUMENTS

CN    204024188 U   12/2014
DE    10031683 A1    1/2002
(Continued)

*Primary Examiner* — Paola Agudelo
(74) *Attorney, Agent, or Firm* — Seed IP Law Group LLP (57) ABSTRACT

A method for pretensioning a tower of a wind power installation, comprising the steps: providing a tensioning device having an adapter element and/or a foundation arrangement and a tensioning element, and/or an adapter element and/or a foundation arrangement, fastening a lower end of a tensioning element a fastening means of the adapter element, fastening an upper end of a tensioning element to an upper end of the tower, tensioning the tensioning element at the lower end of the tensioning element and/or at the upper end of the tensioning element, wherein the tensioning of the tensioning element is effected by reduction of a clearance between the foundation and the adapter element.

9 Claims, 6 Drawing Sheets

(51) Int. Cl.
 *E04C 5/12* (2006.01)
 *F03D 13/20* (2016.01)

(56) References Cited

U.S. PATENT DOCUMENTS

| | | | |
|---|---|---|---|
| 10,626,573 B2 | 4/2020 | Coordes et al. | |
| 10,704,220 B2 | 7/2020 | Coordes | |
| 10,954,686 B2* | 3/2021 | Chase | E04H 12/16 |
| 11,155,976 B1* | 10/2021 | Gillen | E02D 27/12 |
| 2010/0132299 A1* | 6/2010 | Sathian | F03D 13/10 |
| | | | 52/651.01 |
| 2012/0137620 A1* | 6/2012 | Gevers | E04H 12/347 |
| | | | 52/651.01 |
| 2012/0266552 A1* | 10/2012 | Huynh Tong | E04H 12/34 |
| | | | 52/223.13 |
| 2014/0255106 A1* | 9/2014 | Henderson | E02D 5/34 |
| | | | 405/256 |
| 2014/0318033 A1* | 10/2014 | Coordes | E02D 27/42 |
| | | | 52/745.18 |
| 2016/0312431 A1* | 10/2016 | Coordes | E04H 12/12 |
| 2017/0183840 A1* | 6/2017 | Tozer | E02D 27/425 |
| 2018/0238070 A1* | 8/2018 | Chase | F03D 13/20 |
| 2018/0238071 A1* | 8/2018 | Chase | F03D 13/10 |
| 2018/0371783 A1* | 12/2018 | Reyes | E04H 12/003 |
| 2019/0010722 A1* | 1/2019 | Lockwood | E04H 12/16 |
| 2019/0136566 A1* | 5/2019 | Viselli | E04H 12/16 |
| 2021/0108614 A1* | 4/2021 | Prass | E02D 27/425 |
| 2021/0123204 A1* | 4/2021 | Betz | E02D 27/42 |
| 2023/0076691 A1* | 3/2023 | Schriefer | F03D 13/22 |

FOREIGN PATENT DOCUMENTS

| | | |
|---|---|---|
| DE | 102013211750 A1 | 12/2014 |
| DE | 102013225128 A1 | 6/2015 |
| DE | 102013226536 A1 | 6/2015 |
| DE | 102015216444 A1 | 3/2017 |
| EP | 2035699 B1 | 8/2018 |
| WO | 2014/033332 A1 | 3/2014 |
| WO | 2018/108818 A1 | 6/2018 |

* cited by examiner

Fig.4

METHOD FOR PRETENSIONING A TOWER OF A WIND POWER PLANT

BACKGROUND

Technical Field

The invention relates to a method for pretensioning a tower of a wind power installation.

Description of the Related Art

Prestressed concrete structures, especially in the field of prestressed concrete towers such as, for example, a tower of a wind power installation, are tensioned and stiffened with tensioning elements by the application of a tensile force. Towers often comprise a number of composite tower segments. In this case, a single tower segment, or a first and a second tower segment, or the number of tower segments on their own or with respect to each other, can be put under tensile stress. For this purpose, the tensioning elements are appropriately anchored to the tower, for example to the tower base or foundation and to the tower wall, in order to pretension the tower over its height. The tensioning elements may extend in the tower wall, which is also termed internal pretensioning. For this purpose, during the concreting operation empty sleeves are usually concreted-in, through which the tensioning elements are subsequently pulled. Alternatively, the tensioning members may also extend outside the tower wall, for example on the inside of the tower, which is also called external pretensioning. The tensioning elements may be anchored, for example, by means of a fixed anchor and a tensioning anchor.

Known from DE 100 31 683 A1, for example, is a prestressed concrete tower for a wind power installation that has a foundation, a tower composed substantially of concrete, and at least one rope-like prestressed steel element for tensioning the tower. In this case, it is provided that the prestressed steel element is fixed by means of tensioning pockets arranged on the tower.

DE 10 2013 211 750 A1 discloses a wind power installation that has a foundation and a tower, the foundation having a foundation plate, and a foundation plinth on the foundation plate. A tensioning strand connector, having a plurality of drill holes for receiving tensioning strands, is provided on the foundation plinth, the tensioning strands being tensioned on an underside of the connector by means of a tensioning strand head. The foundation plate and the foundation plinth are cast from concrete.

DE 10 2015 216 444 A1 discloses a wind power installation that has a foundation comprising a steel tower having a multiplicity of tower segments and a plurality of tensioning elements. A lower end of the tensioning elements is in this case fastened by means of a fastening unit in or under a first foundation portion. The tensioning elements are fastened at an upper end by means of a fastening unit in or under a first foundation portion. An upper end of the tensioning elements projects beyond an upper end of the concrete foundation plinth and passes through the through-holes. The upper ends of the tensioning elements are tensioned by means of fastening units. An outer side of the concrete foundation plinth is conical.

DE 10 2013 226 536 relates to an arrangement comprising a concrete foundation and a tower for supporting a nacelle of a wind power installation, the tower comprising a number of tower segments arranged along a tower axis, and at least an uppermost tower segment comprising a head flange and a foot flange, an uppermost tower segment of the number of tower segments being formed as a steel member; and a number of tensioning or pulling strands tensioning the concrete foundation to the head flange of the uppermost tower segment under tensile stress.

DE 10 2013 225 128 discloses a wind power installation comprising a foundation and a tower that is placed on the foundation and comprises a plurality of tower segments. The foundation in this case has a tower plinth that is at least partially cast in the foundation. It is provided in this case that the tower plinth has at least two segments, and that a lower tower segment of the tower is tensioned together with the segments of the tower plinth, in particular via tension rods.

Existing solutions allow good pretensioning of tensioning elements, in particular towers of wind power installations, but are often expensive and elaborate constructions and of a high technological complexity.

In addition, there are usually high production, assembly and maintenance costs. In particular, internal pretensioning can often not be adjusted and/or corrected, or only by means of cost-intensive technical resources and a relatively high input of personnel and time.

The German Patent and Trade Mark Office has searched the following prior art in the priority application for the present application: WO 2018/108 818 A1.

BRIEF SUMMARY

Provided are techniques that enables reliable and/or cost-effective pretensioning of a prestressed concrete structure, in particular a tower of a wind power installation. Provided are techniques that ensure a pretensioning of a prestressed concrete structure, in particular of a tower of a wind power installation, by means of easily producible and/or easily mountable and/or easily exchangeable means. At least, an alternative solution to previously known solutions is to be found.

Described according to a first aspect is a foundation arrangement for a tower of a wind power installation, comprising a foundation having an anchor portion and a support portion for supporting a tower wall, and an adapter element having a fastening means for fastening a lower end of a tensioning element for pretensioning a tower for a wind power installation, and a connection means for connecting the adapter element to the anchor portion of the foundation.

In existing solutions for anchoring and/or pretensioning at the foundation, there is usually a foundation basement realized underneath the foundation in order to fasten the tensioned tensioning members to, for example, a ceiling of the foundation basement by means of a tensioning anchor. Typically, the tensioning members are passed through a corresponding opening in the basement ceiling, tensioned by a hydraulic ram device and then fastened against the ceiling by means of the tensioning anchor. In this way, reliable pretensioning can be achieved. However, this is associated with high installation costs and a large amount of work.

In the solution described here, the adapter element is used for pretensioning and/or anchoring tensioning elements of the tower of the wind power installation, in particular for applying an external and/or internal tensioning force to the tower of the wind power installation. For this purpose, the adapter element has a fastening means to which the lower end of the tensioning element may be fastened and preferably tensioned and/or anchored. An upper end of the tensioning element may preferably be fastened and preferably anchored to an upper end of a wind power installation tower. The tensioning element may preferably be tensioned at the lower and/or upper end of the wind power installation tower. For this purpose, for example, a tensioning tool may be attached to one end of the tensioning element.

The adapter element can preferably be arranged on the anchor portion of the foundation and fastened to the anchor portion of the foundation by means of a connection means. The anchor portion in this case is designed to act in combination with the connection means of the adapter element. The anchor portion may be realized, in particular, as a part of the upper side of the foundation and preferably extend from the upper side of the foundation into the interior of the foundation. Preferably, the adapter element may be arranged on the anchor portion such that anchoring and/or tensioning of the tensioning elements may preferably be effected on or above an upper side of the foundation, and a foundation basement may be omitted.

Moreover, the foundation preferably has a support portion that is realized as a bearing surface for a tower wall. In particular, the support portion may be designed to receive and fasten a lower tower segment. Preferably, a tower wall or a lower tower segment may be arranged on the support portion. The support portion may in particular be realized as a part of the upper side of the foundation and preferably extend from the upper side of the foundation into the interior of the foundation.

Foundation arrangements having a foundation and an adapter element for pretensioning a wind power installation tower can be produced and/or assembled much more cost-effectively than known solutions for pretensioning a wind power installation tower, such as, for example, with a foundation basement. Consequently, foundations can be of a flatter design, and thus material costs can be saved. Moreover, by means of such adapter elements, wind power installation towers can also be tensioned more cost-effectively and/or with greater reliability overall.

The adapter element may preferably be arranged inside the wind power installation tower. In this embodiment, adapter elements are preferably not visible on an outer circumferential surface of the tower. The arrangement of preferably individual adapter elements also allows for greater flexibility with regard to the interior design in the tower. For example, certain regions of the foundation surface inside the tower can be kept free for fixtures, such as lines, climbing aids or the like.

Alternatively, the adapter element may preferably be arranged outside the tower, in order to be accessible from the outside. A combination of adapter elements outside and inside the tower wall may also be preferred.

Another advantage of the foundation arrangement having the adapter element fastened to the anchor portion of the foundation is that a foundation of lesser complexity can be used, which reduces the technological resource requirement and cost of producing the foundation. Furthermore, both maintenance and servicing of the pretensioning of the wind power installation tower can be facilitated.

It is also advantageous that wind power installation towers already in operation, both having an internal and/or external pretensioning, can be retrofitted with the adapter element. In particular, wind power installation towers with, for example, a damaged and/or insufficient number of tensioning elements for a changed load situation can also be retrofitted with the adapter element and further tensioning elements and thus continue to be operated.

The foundation may preferably be set into an excavation, in which case, in particular, the upper side of the foundation preferably lies substantially at ground level and is preferably flat and/or at least not curved. Preferably, the foundation may have at least one raised portion, the upper side of which lies above the ground level, and/or at least one lower portion, the upper side of which lies below the ground level. In particular, the support portion may preferably be spaced apart from or adjacent to the anchor portion. Preferably in particular, the support portion and the anchor portion may be spaced differently from a vertical longitudinal axis of the wind power installation tower. Preferably, the anchor portion may have a greater and/or lesser radial distance from the vertical longitudinal axis of the wind power installation tower than the support portion. The adapter element may thus be arranged further inwards and/or further outwards compared to the tower wall.

Preferably, the support portion may be annular, in particular preferably adapted to a shape of the tower wall of the wind power installation tower. Wind power installation towers usually have an annular cross section orthogonal to the vertical longitudinal axis. This annular cross section may be circular or polygonal in shape. The term annular in this case is therefore to be understood to mean not only a circular ring-shaped design, but also a polygonal and/or multi-angular design that has a plurality of straight portions. The anchor portion may thus be realized, in particular, inside the self-contained, circumferential support portion and/or outside the self-contained, circumferential support portion.

The adapter element may preferably be arranged and fastened on the anchor portion, i.e., on the upper side of the foundation. The adapter element may be fastened to the anchor portion by means of, for example, an adhesive or bonding layer.

The underside of the adapter element may preferably extend into an interior of the anchor portion, i.e., into an interior of the foundation, and be fastened there, in particular set in concrete.

Alternatively, the underside of the adapter element may also be arranged and preferably fastened on a spacer, in which case preferably the spacer is arranged and preferably fastened on the anchor portion. Particularly preferably, the adapter element may be detachably fixed on the spacer and the spacer can be detachably fastened on the anchor portion. For example, the spacer may be arranged on the anchor portion and preferably fastened by means of a weight force of the adapter element. The spacer may be realized as two, three or more spaced apart, preferably evenly spaced apart, stools or a self-contained ring, in particular adapted to a shape of the underside of the adapter element.

Preferably, two, three or more tensioning elements may be provided, which are preferably parallel to a direction, preferably parallel to a longitudinal axis of the wind power installation tower. The tensioning elements may also be inclined in relation to the longitudinal axis of the wind power installation tower. Preferably, an angle of inclination of a tensioning element corresponds to the angle of inclination of the wind power installation tower, in particular an inner and/or outer side of the wall of the wind power installation tower. Furthermore, the tensioning element may preferably have different angles of inclination.

Tensioning elements are preferably made of steel or a material that comprises steel. Particularly preferably, tensioning elements may be composed of or comprise fibers, in particular steel fibers and/or carbon fibers and/or aramid fibers and/or ceramic fibers and/or natural fibers and/or glass fibers and/or the like. Tensioning elements may comprise, for example, rods and/or be rod-shaped. Tensioning elements may comprise ropes or be rope-shaped. Tensioning elements may comprise inlays and/or strands, a strand preferably comprising a plurality of wires. Preferably, the inlay is enclosed by strands and/or wires. A material of the inlay may comprise plastic and/or steel and/or natural and/or synthetic fibers, the inlay preferably being wire-like and/or rope-like and/or bar-like and/or fiber-like and/or rod-like.

The fastening means is designed for fastening the tensioning element, in particular for fastening a connection head, preferably in the form of a wedge, of the tensioning element. The fastening means is preferably designed to be connected to the tensioning element in a preferably detachable and/or preferably pre-tensioned manner. The tensioning element is preferably designed to be connected to the connection head, in particular the wedge, in the fastening means, preferably fastened and/or preferably pretensioned. In this case, the connection head may preferably be fastened and/or preferably connected in a pretensioned manner by means of an anchor within the fastening means.

Preferably, the adapter element has two, three or more tensioning elements and/or two, three or more fastening means. Preferably, the number of tensioning elements is equal to the number of fastening means. In particular, preferably, two, three or more adapter elements are arranged on the anchor portion and/or on two, three or more anchor portions, the adapter elements preferably being arranged equidistantly, in particular spaced apart from one another in the circumferential direction.

To pretension, in particular to apply a tensile force, for example by tensioning elements, may also be referred to as to tension. In the present application, the two terms to "pretension" and to "tension" (and term pairs derived therefrom, such as pretensioning/tensioning, pretensioned/tensioned, etc.) may therefore preferably be understood as interchangeable and/or synonymous. Enabling a tensile force to be applied may also be referred to as anchoring, and the term to "anchor" or "anchoring" may therefore also be understood herein as being synonymous.

Insofar as reference is made to the arrangement of the adapter element in relation to the wind power installation tower, directional indications such as, for example, radial, in the circumferential direction, etc., preferably refer to a tower, in particular to a substantially vertical longitudinal axis of a tower, and refer to any cross-sectional shapes of such a tower, in particular both circular cross sections and polygonal cross sections. Moreover, preferably, indications such as horizontal, vertical, bottom, top, etc., also refer to an installation state of a wind power installation tower. Thus, as a rule, the foundation forms a lower end and a nacelle an upper end of a wind power installation tower in the installed state.

The invention is not limited to use with wind power installation towers, although here it can be used particularly advantageously and in an economically efficient manner. Rather, a foundation arrangement for pretensioning described here may also be used in similar loading situations of other structures, in particular towers of other types.

In a particularly preferred embodiment variant of the foundation arrangement, the adapter element is annular. Preferably in this case, a cross section of the opening defined by the ring, which is preferably closed in itself, may define the fastening means. Preferably, the tensioning element can pass through the opening of the ring and be fastened by means of an anchor whose dimensions are larger than the dimensions of the cross section of the opening of the ring. Particularly preferably, the adapter element may be realized as a segment ring consisting of at least two ring segments. These at least two segment rings may preferably be put together during assembly in such a manner that the lower end of the tensioning element can be easily inserted and fastened. The design of the adapter element consisting of at least two ring segments is particularly advantageous in that the ring segments are preferably easy to produce and/or easy to transport and/or arrange, and consequently preferably also easy fastening and tensioning of the tensioning elements can be ensured.

The adapter element may preferably be realized as a cylinder, truncated pyramid, truncated cone or the like. It is particularly preferred in this case that the adapter element can be arranged and fastened on the upper side of the anchor portion. Preferably, the adapter element may have a side wall, which preferably forms a peripheral surface, extending from the underside of the adapter element to the upper side of the adapter element and comprising a collar, preferably on the upper side of the adapter element, projecting from the side wall, preferably radially inwards. The collar may preferably extend substantially orthogonally from the upper side of the adapter element and form a projection. Preferably in this case, a height of a side wall may be greater than a height of the collar, particularly preferably the height of the side wall may be greater than the height of the collar and less than twice the height of the collar. Preferably, the height of the side wall can be at least double, triple or quadruple the height of the collar. Preferably, the design of the side wall and the collar may preferably define a cavity that defines the fastening means.

Alternatively, it may be particularly preferred that the adapter element extends substantially in the shape of a bar from its underside to its upper side. Preferably, there may be a bracket realized on the upper side of the bar-shaped basic body, which preferably extends from the bar-shaped basic body to its front side. Preferably, the rod-shaped body may extend orthogonally in relation to the surface of the foundation, or anchor portion. Preferably, the bracket may extend orthogonally in relation to the bar-shaped basic body. The fastening means may preferably be realized by a recess, preferably a passage, which is preferably realized within the bar-shaped basic body and/or the bracket. Furthermore, the fastening means may be defined by an interspace between a first bracket, preferably the front side of the first bracket, of a first bar-shaped adapter element and a second bracket, preferably the front side of the second bracket, of a second bar-shaped adapter element arranged at a distance from the first bar-shaped adapter element.

According to a further preferred embodiment variant, it is provided that the fastening means extends substantially in a vertical direction, from an upper side of the adapter element, through the adapter element and/or into an interior of the adapter element. Preferably, the fastening means may thus extend orthogonally in relation to the upper side of the adapter element and/or to the underside of the adapter element. In particular, the fastening means in this case may preferably be realized as a recess, in particular as a through-opening.

Preferably, the fastening means may be defined by the cavity, if any, and/or the interspace, if any, and/or the recess.

Preferably, a first fastening portion may form a passage from the upper side of the adapter element to a second fastening portion. The first fastening portion may in this case have a dimension to allow tensioning elements to pass through. The second fastening portion may preferably either be realized inside the adapter element and have a dimension configured to fasten a tensioning element, preferably by means of an anchor. Alternatively, the second fastening portion may preferably be realized on the underside of the adapter element and be configured to fasten the tensioning element, preferably by means of an anchor.

In particular, it is preferred that the fastening means extends substantially in a vertical direction into an interior of the adapter element.

It is further preferred that the fastening means extends substantially in a vertical direction from an upper side of the adapter element through the adapter element.

According to a further preferred embodiment, it is provided that the anchor portion comprises a connection element that is designed to act in combination with the connection means. For this purpose, particularly preferably, threaded rods or other tensioning members may be integrated in the foundation, i.e., preferably embedded in concrete and/or anchored in the foundation and preferably projecting upwards from the surface of the foundation. Alternatively or additionally, a foundation cage may preferably be integrated in the foundation and comprise the threaded rods or the other tensioning members, in order to connect the adapter element to the foundation cage. The threaded studs or the other tensioning members may preferably be pulled through the connection means, which is preferably realized as a passage from the underside of the adapter element to the upper side of the adapter element, and may preferably be fastened and/or preferably screwed to the upper side of the adapter element. This design allows the adapter element to be connected to the foundation in a particularly simple and cost-effective manner and, in particular, to be reliably secured against, for example, displacement. A particularly reliable connection of the adapter element to the anchor portion plays a decisive role in particular in the tensioning of the wind power installation tower. In particular, this allows the foundation to be made much flatter. Another advantage is that the design of the foundation cage and/or of the threaded rods or other tensioning members integrated in the foundation can be adapted to a region of the anchor portion.

Particularly preferably, the connection means may be realized on the side wall or the bar-shaped basic body of the adapter element and preferably extend from the underside to the upper side of the adapter element. In this case, the connection means may preferably be configured to act in combination with the anchor portion and to fasten the adapter element to the foundation, preferably in a fixed manner.

Furthermore, it is preferred that the adapter element has two, three or more connection means. This ensures a particularly reliable fixed fastening of the adapter element to the anchor portion and secures it against unintentional displacement due to the forces that occur.

According to a further preferred embodiment variant, it is provided that the anchor portion comprises one, two, three or more connection elements, which are designed to act in combination with the connection means. Preferably, one, two, three or more connection elements may be provided per connection means. In this way, the adapter element can be fastened to the anchor portion in a particularly reliable manner and/or, if necessary, the tensioning element can be pretensioned by means of the adapter element.

According to a preferred embodiment variant, the foundation comprises reinforced concrete and/or prestressed concrete or consists entirely or partly of reinforced concrete and/or prestressed concrete.

Furthermore, it is preferred that the adapter element comprises reinforced concrete and/or prestressed concrete or consists entirely or partly of reinforced concrete and/or prestressed concrete. It is particularly preferred that the adapter element is made of steel or as a prefabricated reinforced and/or prestressed concrete part.

According to a further preferred embodiment variant, a first clearance between an underside of the fastening means and the anchor portion is dimensioned in such a manner that an anchor of the tensioning element can be arranged there, and/or a second clearance between an underside of the adapter element and the anchor portion is dimensioned in such a manner that an anchor of the tensioning element and/or a tensioning tool for tensioning the tensioning element can be arranged there.

For tensioning a structure, in particular a tower of a wind power installation, a tensioning anchor and/or a fixed anchor are preferably used. The tensioning anchor may preferably be connected to the fixed anchor at another point of the structure via one or more tensioning elements and may preferably generate the tensile stress upon a component or between components of a structure, such as, for example, between tower segments of a tower, in particular a wind power installation tower, by application of tensile stress between the tensioning anchor and the fixed anchor. For this purpose, a tensioning anchor may have application means for applying the tensioning tool, and is in particular designed to move a tensile cord against the tensioning anchor and thus put it under tensile stress. In contrast, a fixed anchor is preferably used to hold one or more tensile cords to the fixed anchor. For this purpose, a fixed anchor may be fixed at a suitable location on the structure and preferably does not require any functional means to change or increase a tensile stress of a tensile cord. In general, the anchoring and/or pretensioning of the tensioning members by means of the tensioning anchor may preferably be effected at the upper end or at the lower end of the tower.

Particularly preferably, the first clearance and/or the second clearance may each be measured from the upper side of the anchor portion. Furthermore, it is preferred if the tensioning element can be fastened in the anchor by means of a wedge. This design ensures accessibility of the fixed anchor and/or the tensioning anchor and simplifies both assembly and maintenance work.

Another preferred further development of the foundation arrangement is characterized by a deflection means for deflecting a tensioning element in the direction of the fastening means. This design is particularly advantageous if internal tensioning and/or external tensioning is to be effected close to the tower wall.

Preferably, the deflection means may comprise a first deflection unit and a second deflection unit, the first deflection unit preferably being arranged substantially in a vertical direction, preferably centered, above the fastening means and being designed to deflect a tensioning element that projects in a vertical direction from the adapter element, such that this preferably extends substantially horizontally in the direction of the tower wall. Close to the tower wall, preferably on the tower wall, or in an interior of the tower wall, preferably partially in the interior of the tower wall, the second deflection unit may preferably be provided, which is designed to deflect the tensioning element in such a manner that the angle of inclination of the tensioning element corresponds to the angle of inclination of the wind power installation tower and/or the tensioning element is substantially parallel to the tower wall. This design enables the adapter element to be arranged at a distance from the tower wall, and thus tensioning elements can be fastened and/or pretensioned further inwards, while at the same time the transmission of the tensioning force to the tower wall is advantageously effected further outwards in a radial direction. It is thus possible to avoid or reduce, for example, unfavorable force lines and/or moments that can occur during external tensioning, in particular due to the distance to the tower wall. This makes it possible to use tensioning by means of the adapter element in a variety of towers, both as the sole or additional tensioning technique in the construction of new towers or in the retrofitting of towers.

Described according to a further aspect is an adapter element for a foundation arrangement, having a fastening means for fastening a lower end of a tensioning element for pretensioning a tower for a wind power installation, and having a connection means for connecting the adapter element to an anchor portion of a foundation.

Furthermore, the aspect of a tensioning device for a tower of a wind power installation is described, comprising an adapter element and/or a foundation arrangement and a tensioning element, the lower end of which is fastened to the fastening means, and the upper end of which is fastenable to an upper end of the tower.

Preferably, the tensioning of the tensioning element causes a tensioning force to be transmitted to the fastening means and/or via the fastening means to the adapter element and/or via the adapter element to the foundation, in particular the anchor portion.

Furthermore, the aspect of use of an adapter element for anchoring and/or pretensioning a tensioning element and/or in a tensioning device is described.

Described according to a further aspect is a tower for a wind power installation, comprising a tensioning device and/or an adapter element and/or a foundation arrangement, a tower wall being arranged on the anchor portion.

Described according to a further aspect is a wind power installation, comprising a tower and/or an adapter element and/or a foundation arrangement.

For further advantages, embodiment variants and embodiment details of these further aspects and their possible further developments, reference is also made to the previously given description of the corresponding features and further developments of the foundation arrangement.

Described according to a further aspect is a method for producing a foundation arrangement for a wind power installation, comprising the steps of: producing a foundation having a support portion and an anchor portion, and producing or providing an adapter element that can be arranged on the anchor portion and having a fastening means for fastening a lower end of a tensioning element for pretensioning a tower for a wind power installation, and having a connection means for connecting the adapter element to the anchor portion of the foundation.

Preferably, the foundation and the adapter element may be produced or provided simultaneously, or continuously. In particular, the foundation may be cast in-situ, preferably from in-situ concrete, particularly preferably in one piece. Further preferably, the adapter element may be provided as a prefabricated or semi-prefabricated part and, following casting and curing of the foundation, may be arranged and fastened on the anchor portion provided for this purpose.

The method for producing a foundation arrangement for a wind power installation may preferably be further developed by preferably transporting an adapter element from a production location to an installation location.

A further preferred development of the method is characterized in that the production of a foundation includes providing a connection element that is designed to act in combination with a connection means.

Preferably, the foundation may be realized in such a manner that in the region of the anchor portion, the connection element, preferably in the form of connection reinforcement, i.e., threaded rods or other tensioning members, projects from an interior of the foundation, preferably substantially orthogonally from an upper side of the foundation.

Provided is a method for pretensioning a tower of a wind power installation, comprising the steps: providing a tensioning device and/or an adapter element and/or a foundation arrangement, fastening a lower end of a tensioning element to a fastening means of the adapter element, fastening an upper end of a tensioning element to an upper end of the tower, and tensioning the tensioning element at the lower end of the tensioning element and/or at the upper end of the tensioning element. Preferably, the lower end of the tensioning element may be pulled through a recess and fastened with wedges by means of an underlying tensioning anchor.

Preferably in a first step, the upper end of the tensioning element may be fastened to the upper end of the tower, and subsequently the tensioning element may be fastened to the lower end of the tensioning element and preferably tensioned. Alternatively, preferably in a first step, for this purpose the lower end of the tensioning element may be fastened to the lower end of the tower, and subsequently the tensioning element may be fastened to the upper end of the tower and preferably tensioned. Preferably, fastening of the lower end and the upper end of the tensioning element may be effected simultaneously, or continuously, the tensioning preferably being effected only after both ends have been fastened.

It is further preferred that tensioning the tensioning element includes applying a tensioning tool to a tensioning anchor arranged at an upper end of the tensioning element and/or applying a tensioning tool to a tensioning anchor arranged at a lower end of the tensioning element.

It may be tensioned, for example in a first step, at the top and/or bottom.

Furthermore, it is preferred that there is a clearance between the anchor portion and the adapter element, in particular an upper side of the anchor portion and a lower side of the adapter element, before tensioning of the tensioning element, which clearance is reduced following tensioning of the tensioning element. Preferably, this clearance may be reduced to zero if necessary.

Another preferred further development of the method is characterized in that the reduction of the clearance between the anchor portion of the foundation and the adapter element is preferably effected by means of the connection elements and preferably the connection means, and/or a spacer is preferably temporarily inserted preferably between the anchor portion and the adapter element, and/or a height of the spacer is preferably variable, and/or the spacer is preferably removed before tensioning of the tensioning element.

The methods described here and their possible further developments have features, or method steps, that make them particularly suitable for a foundation arrangement described here and its further developments, as well as for an adapter element, a tensioning device, a wind power installation tower and a wind power installation. For further advantages, embodiment variants and embodiment details of these further aspects and their possible further developments, reference is also made to the description relating to the corresponding features and further developments of the other aspects.

BRIEF DESCRIPTION OF THE SEVERAL VIEWS OF THE DRAWINGS

Preferred exemplary embodiments are explained exemplarily on the basis of the appended figures. There are shown.

DETAILED DESCRIPTION

In the figures, identical or substantially functionally identical or similar elements are denoted by the same references.

Figure 1:
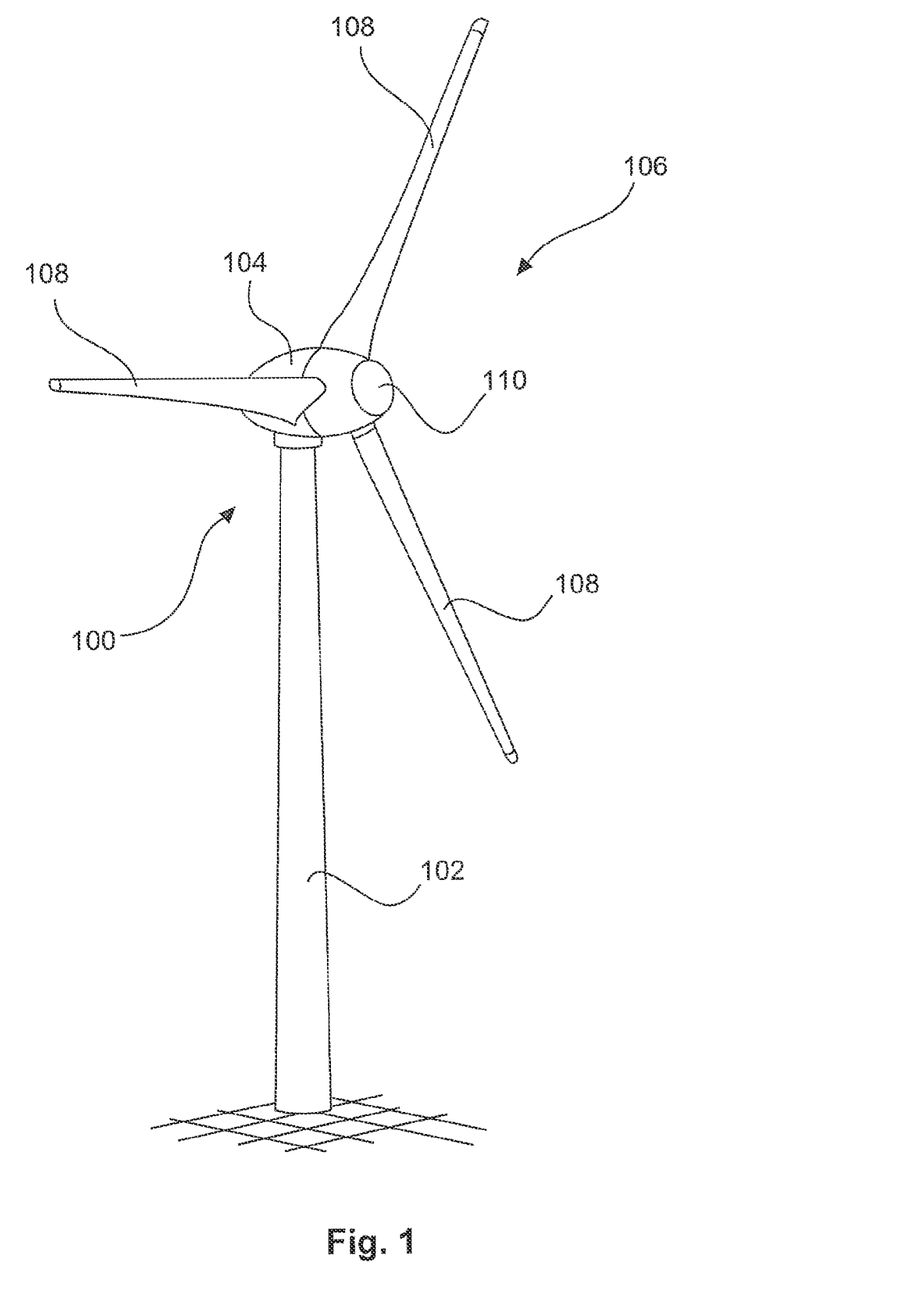
FIG. 1 a three-dimensional view of a wind power installation comprising a tower and a nacelle.

FIG. 1 shows a schematic, three-dimensional view of a wind power installation. The wind power installation 100 has a tower 102 and a nacelle 104 on the tower 102. Provided on the nacelle 104 there is an aerodynamic rotor 106 that has three rotor blades 108 and a spinner 110. During operation of the wind power installation, the aerodynamic rotor 106 is caused to rotate by the wind and thus also rotates an electrodynamic rotor or generator rotor, which is directly or indirectly coupled to the aerodynamic rotor 106. The electrical generator is arranged in the nacelle 104 and generates electrical energy. The pitch angles of the rotor blades 108 may be varied by pitch motors at the rotor blade roots of the respective rotor blades 108. The tower 102 of the wind power installation 100 has a foundation arrangement as part of a tensioning system as described herein.

Figure 2:
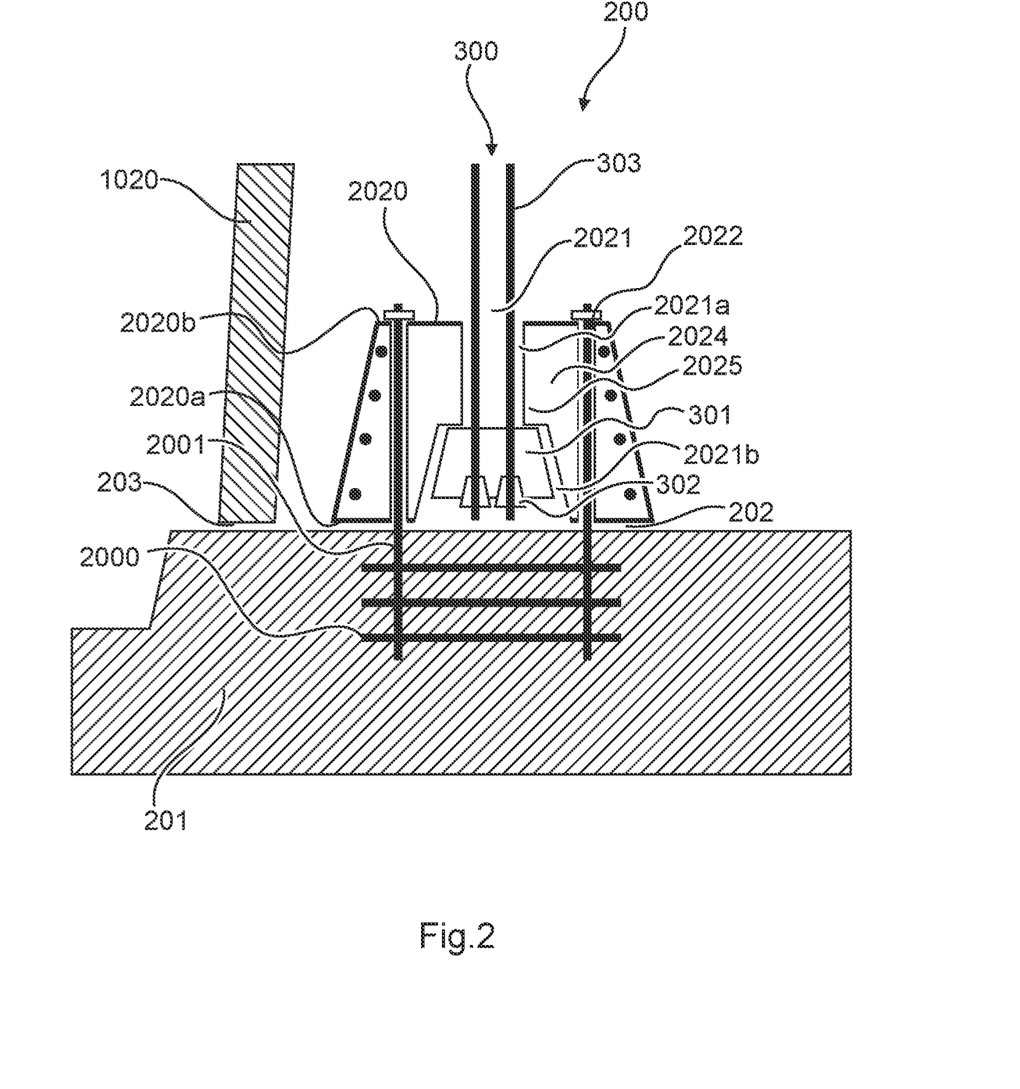
FIG. 2 a sectional representation of a foundation arrangement according to a first embodiment variant.
Figure 3:
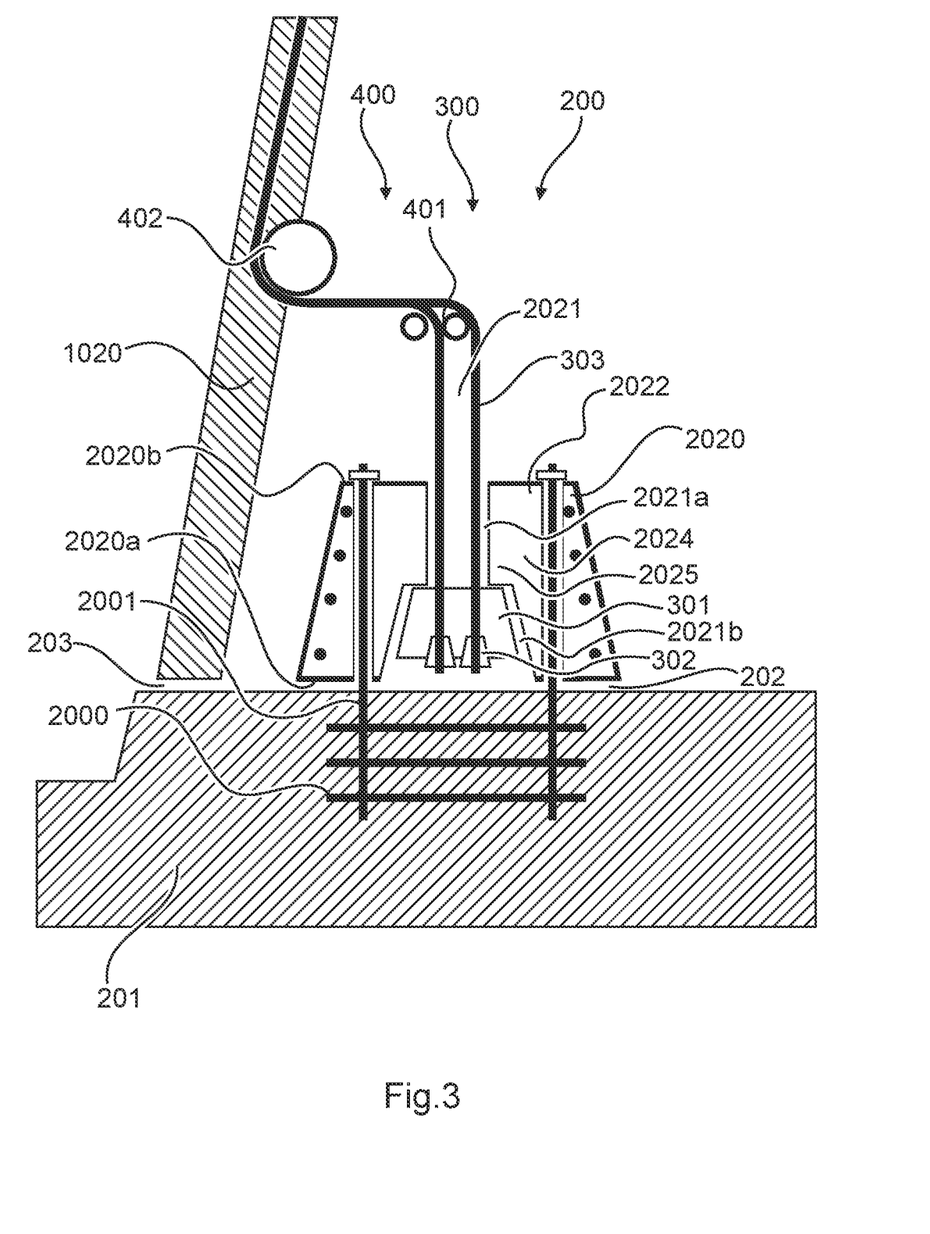
FIG. 3 a sectional representation of a foundation arrangement according to a second embodiment variant.
Figure 4:
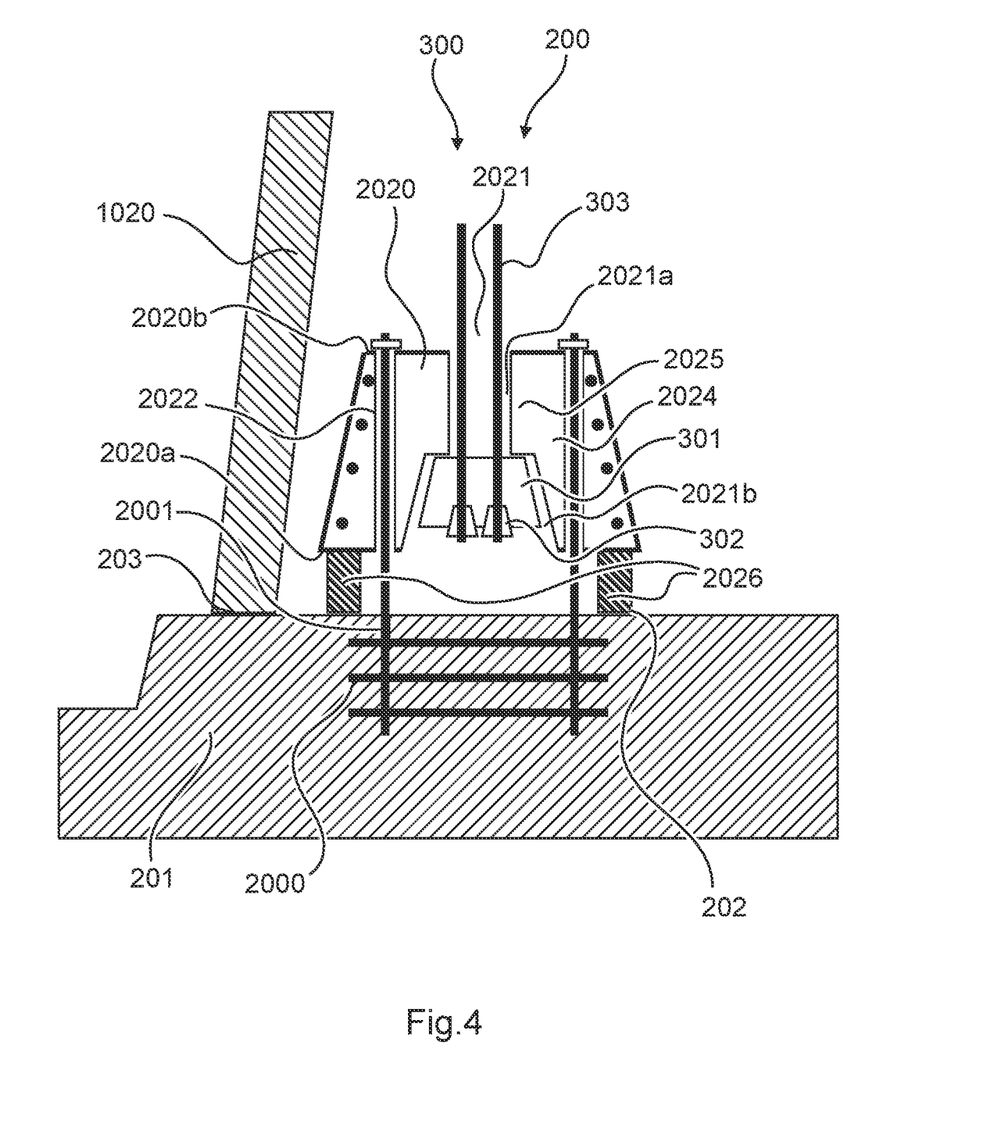
FIG. 4 a sectional representation of a foundation arrangement according to a third embodiment variant.

FIGS. 2, 3 and 4 show a foundation arrangement 200 for a wind power installation tower, comprising a foundation 201 that has an anchor portion 202 and a support portion 203 spaced from the anchor portion 202. A tower wall 1020 is arranged on the support portion 203, which is realized as a tower-wall base area. In the region of the anchor portion 202, the foundation 201 has a foundation cage 200 having connection elements 2001 extending from the foundation cage 200, out of the interior of the foundation 201, to a surface of the foundation 201 and projecting in a vertical direction from this surface. These connection elements 2001 define the anchor portion 202 of the foundation 201. The connection elements 2001 in this case are designed to act in combination with a connection means (connector) 2022 of the adapter element 2020.

The adapter element 2020 comprises a connection means 2022, which extends from an upper side 2020b of the adapter element 2020 to an underside 2020a of the adapter element 2020 and is realized as a kind of through opening. The adapter element 2020 in this case is placed on the anchor portion 202 in such a manner that the connection elements 2001 pass through the connection means 2022 and are fastened to an upper side 2020b of the adapter element 2020.

The adapter element 2020 is realized as a truncated cone and comprises a side wall extending from the underside 2020a of the adapter element 2020 to the upper side 2020a of the adapter element 2020, and comprising a collar 2025 projecting radially inwardly from the side wall. The side wall and the collar 2025 define a cavity inside the adapter element. This cavity is realized as a passage and extends vertically from the upper side 2020b of the adapter element 2020, through the adapter element 2020. In this case, the cavity, comprising a first fastening portion 2021a and a second fastening portion 2021b, defines the fastening means (fastener) 2021. The side wall has a height approximately twice that of the collar 2025. The first fastening portion 2021a extends from the upper side 2020b of the adapter element 2020 to the second fastening portion 2021b, and defines a passage having a diameter to allow the tensioning elements 303 to pass through. The first fastening portion 2021a in this case is defined by the collar 2025. The second fastening portion 2021b extends between the first fastening portion 2021a and the underside 2020a of the adapter element 2020. A diameter of the second fastening portion 2021b is greater than a diameter of the first fastening portion 2021a, in order to reliably anchor an anchor 301 in which the tensioning elements 303 are secured by means of wedges 302. In FIGS. 2, 3 and 4, two tensioning elements 303 each pass through the first fastening portion 2022a. The tensioning elements 303 each have a wedge 302 to anchor them in an anchor 301. The second fastening portion 2022b in this case has a height that is greater than a height of the anchor 301 with the wedges 302 fastened therein.

FIG. 2 shows an external tensioning of the wind power installation tower in an interior of the tower. The tensioning elements 303 anchored in the adapter element 2020 extend substantially parallel to each other in a vertical direction from an adapter element 2020 to an upper end of the tower (not shown here).

FIG. 3 shows the design of an internal tensioning system. For this purpose, a first deflection unit 401 is arranged centered in the vertical direction above the fastening means and at a distance from the adapter element. This deflection unit 401 is designed to deflect the tensioning element 303, which projects in the vertical direction from the upper side 2020b of the adapter element 2020, such that it is deflected by approximately 90° in the direction of the tower wall 1020 and extends horizontally in the direction of the tower wall 1020. A second deflection unit 402 is arranged on the tower wall 1020 and extends partially into an interior of the tower wall 1020, such that the tensioning element 303 is deflected in such a manner that it runs inside the tower wall in the direction of the upper end of the tower wall (not shown here). In this case, the tensioning element 303 extends substantially parallel to the outer side and the inner side of the tower wall 1020.

FIG. 4 shows another embodiment variant of a foundation arrangement 200. The basic structure of the adapter element corresponds to the structure of the designs shown in FIGS. 2 and 3. The adapter element 2020 in this case is arranged on a spacer 2026. An underside of the spacer 2026 is in this case arranged on an upper side of the anchor portion 202, the underside 2020a of the adapter element 2020 being arranged on the upper side of the spacer 2026. This embodiment variant is advantageous, in particular, in the case of a method for pretensioning the tower. Following fastening of the tensioning elements 303 to a lower end and to an upper end of the tower, the spacers 2026 may, for example, be removed or reduced in size. This allows the adapter element 2020 to be moved in the direction of gravity, i.e., in the direction of the anchor portion 202, and fastened by means of the connection elements 2001 fastened in the connection means (connector) 200, such that the tensioning device becomes tensioned.

Figure 5:
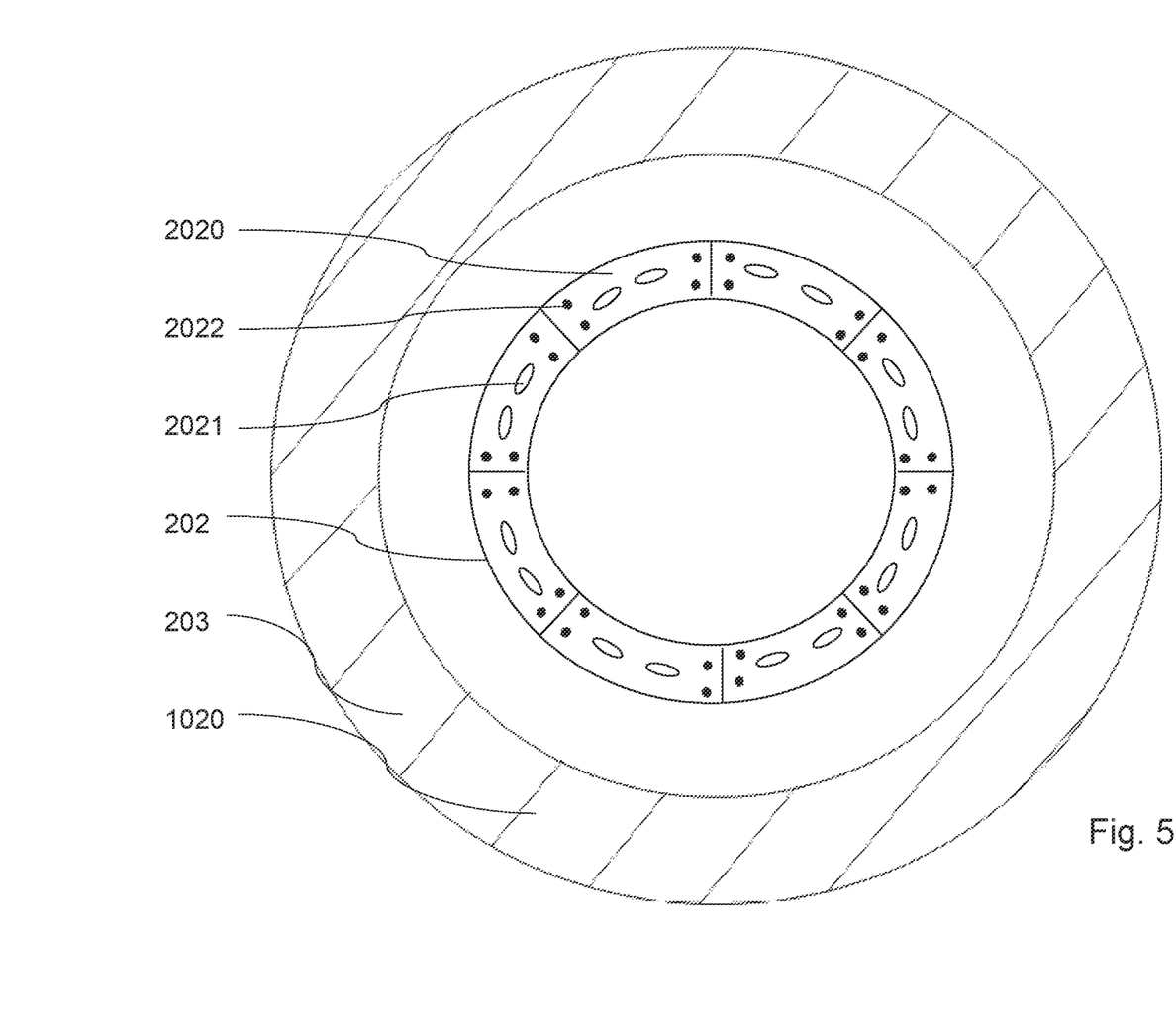
FIG. 5 a schematic top view of a foundation arrangement according to a first variant for arrangement of adapter elements.
Figure 6:
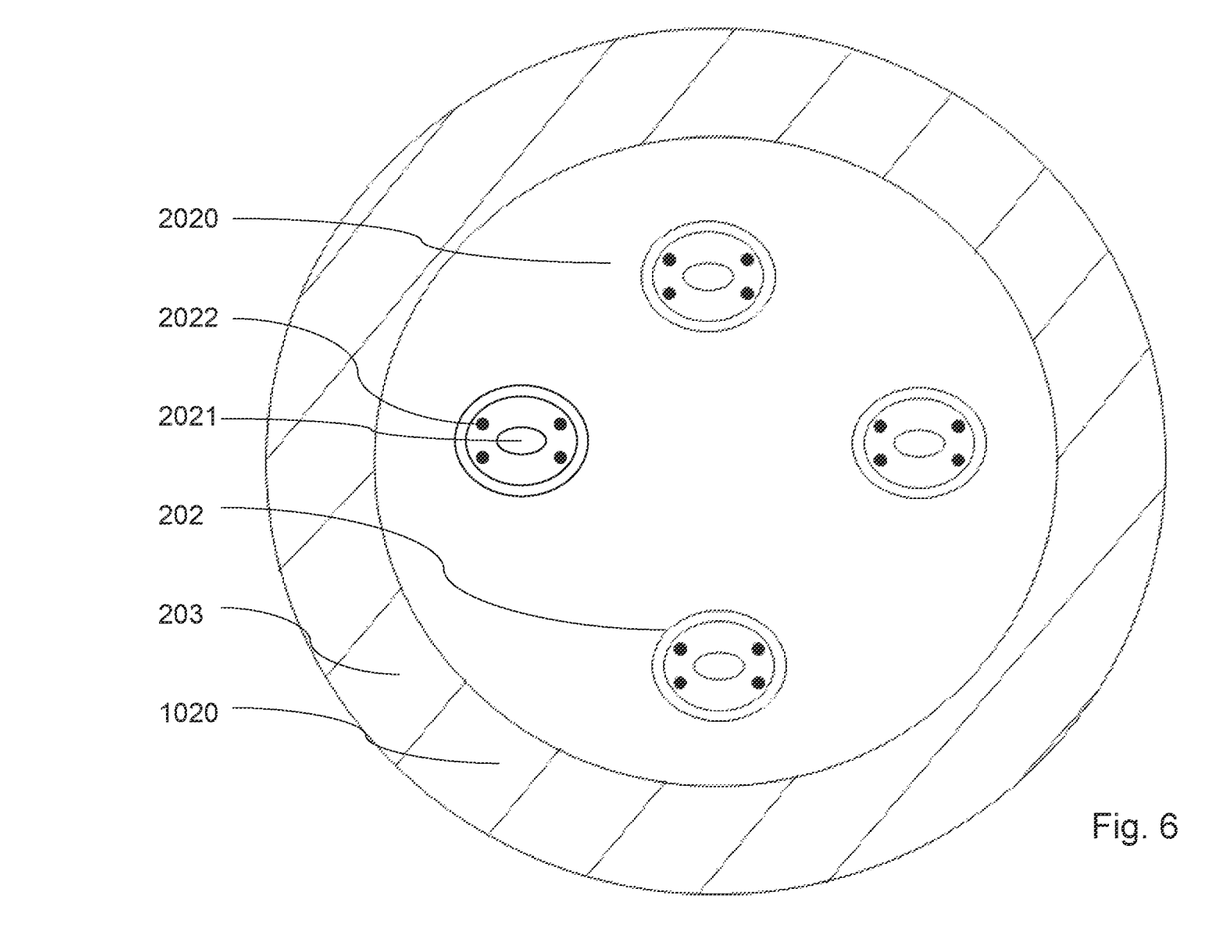
FIG. 6 a schematic top view of a foundation arrangement according to a second variant for arrangement of adapter elements.

FIGS. 5 and 6 respectively show different arrangement variants and design variants of the adapter elements 2020 on the anchor portion 202, which is realized within a self-contained circumferential support portion 203.

FIG. 5 in this case shows a ring arrangement consisting of a plurality of individual adapter elements 2020 in the form of ring segments. These ring segments are arranged radially spaced from the support portion 203 and are assembled in such a manner that a circumferential adapter ring is realized. Particularly preferably, each ring segment may be produced as a prefabricated part or a semi-prefabricated part, such that particularly simple assembling is made possible. The individual adapter elements 2020 each comprise four connection means 2022 and two individual fastening means 2021.

FIG. 6 shows an exemplary design of the arrangement of four adapter elements 2020 on the anchor portion 202. The anchor portion 202 is realized within the support portion 203. The adapter elements 2020 are realized as a truncated cone and are arranged, radially spaced from the support portion 203, on the respective anchor portion 202. The adapter elements 2020 are substantially evenly spaced from each other. According to this embodiment, each adapter element 2020 comprises four connection means 2022 and one fastening means 2021.

The foundation arrangement, the adapter element and the foundation have various advantages. In particular, adapter elements can be produced inexpensively, in particular prefabricated, and can be easily transported. Furthermore, the foundation can be produced so as to be flatter and less complex, such that both working time and costs can be saved. In particular, a service life of a wind power installation tower can be extended, as adapter elements and/or tensioning elements can be easily replaced in case of damage.

REFERENCES

- 100 wind power installation
- 102 tower
- 104 nacelle
- 106 aerodynamic rotor
- 108 rotor blades
- 110 spinner
- 200 foundation arrangement
- 201 foundation
- 202 anchor portion
- 203 support portion
- 300 tensioning device
- 301 anchor/tensioning anchor/fixed anchor
- 302 wedge
- 303 tensioning element
- 400 deflection means
- 401 first deflection unit
- 402 second deflection unit
- 1020 tower wall
- 2000 foundation cage
- 2001 connection element
- 2020 adapter element
- 2020a underside
- 2020b upper side
- 2021 fastening means
- 2021a first fastening portion
- 2021b second fastening portion
- 2022 connection means
- 2024 side wall
- 2025 collar
- 2026 spacer

The invention claimed is:

1. A method for pretensioning a tower of a wind power installation, the method comprising:
   fastening a lower end of a tensioning element to an adapter element such that the tensioning element extends through a cavity within the adapter element;
   fastening an upper end of the tensioning element to an upper end of the tower;
   inserting a spacer between a foundation of the tower and the adapter element; and
   tensioning the tensioning element at the lower end of the tensioning element and/or at the upper end of the tensioning element,
   wherein tensioning the tensioning element comprises reducing a clearance between the foundation of the tower and the adapter element.

2. The method for tensioning a tower of a wind power installation as claimed in claim 1, wherein the adapter element is coupled to a foundation arrangement comprising the foundation having an anchor portion and a support portion for supporting a tower wall, and wherein a connector connects the adapter element to the anchor portion of the foundation.

3. The method for tensioning a tower of a wind power installation as claimed in claim 1, wherein the adapter element has a connection means that connects the adapter element to an anchor portion of the foundation.

4. The method for tensioning a tower of a wind power installation as claimed in claim 1, wherein that the adapter element is annular shaped.

5. The method for tensioning a tower of a wind power installation as claimed in claim 1, wherein the cavity extends substantially in a vertical direction from an upper side of the adapter element through the adapter element and/or into an interior of the adapter element.

6. The method for tensioning a tower of a wind power installation as claimed in claim 3, wherein the anchor portion comprises a connection element configured to act in combination with the connection means.

7. The method for tensioning a tower of a wind power installation as claimed in claim 3, comprising:
   a first clearance between an underside of the cavity and the anchor portion that is dimensioned in such a manner to receive an anchor of the tensioning element.

8. The method for tensioning a tower of a wind power installation as claimed in claim 1, comprising deflecting a tensioning element in a direction of the cavity.

9. The method for tensioning a tower of a wind power installation as claimed in claim 3, comprising a second clearance between an underside of the adapter element and the anchor portion that is dimensioned in such a manner to receive an anchor of the tensioning element and/or a tensioning tool for tensioning the tensioning element.

* * * * *